United States Patent
Lin et al.

(10) Patent No.: US 12,047,213 B2
(45) Date of Patent: Jul. 23, 2024

(54) METHOD OF CONFIGURING A PUSCH REPETITION AND USER EQUIPMENT USING THE SAME

(71) Applicant: FG Innovation Company Limited, New Territories (HK)

(72) Inventors: Wan-Chen Lin, Taipei (TW); Chia-Hao Yu, Taipei (TW); Jia-Hong Liou, Taipei (TW); Hai-Han Wang, Taipei (TW)

(73) Assignee: FG Innovation Company Limited, New Territories (HK)

( * ) Notice: Subject to any disclaimer, the term of this patent is extended or adjusted under 35 U.S.C. 154(b) by 316 days.

(21) Appl. No.: 17/570,331

(22) Filed: Jan. 6, 2022

(65) Prior Publication Data
US 2022/0224578 A1 Jul. 14, 2022

Related U.S. Application Data

(60) Provisional application No. 63/135,487, filed on Jan. 8, 2021.

(51) Int. Cl.
*H04L 27/26* (2006.01)
*H04L 1/08* (2006.01)
*H04L 5/00* (2006.01)
*H04W 72/23* (2023.01)

(52) U.S. Cl.
CPC ............ *H04L 27/2605* (2013.01); *H04L 1/08* (2013.01); *H04L 5/0051* (2013.01); *H04L 27/2613* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2020/0288488 | A1* | 9/2020 | Park | H04W 72/23 |
| 2020/0367208 | A1* | 11/2020 | Khoshnevisan | H04L 5/0048 |
| 2022/0210810 | A1* | 6/2022 | Khoshnevisan | H04W 72/1268 |
| 2023/0049937 | A1* | 2/2023 | Takahashi | H04W 72/231 |

OTHER PUBLICATIONS

3GPP, "Technical Specification, 3rd Generation Partnership Project; Technical Specification Group Radio Access Network; NR; Physical layer procedures for data (Release 16)." 3GPP TS 38.214 V16.7.0, Sep. 2021, pp. 1-172.
3GPP, "Technical Specification, 3rd Generation Partnership Project; Technical Specification Group Radio Access Network; NR; Physical layer procedures for data (Release 15)." 3GPP TS 38.214 V15.14.0, Sep. 2021, pp. 1-106.
3GPP, "Technical Specification, 3rd Generation Partnership Project; Technical Specification Group Radio Access Network; NR; Radio Resource Control (RRC) protocol specification (Release 15)." 3GPP TS 38.331 V15.15.0, Sep. 2021, pp. 1-540.
3GPP, "Technical Specification, 3rd Generation Partnership Project; Technical Specification Group Radio Access Network; NR; Radio Resource Control (RRC) protocol specification (Release 16)." 3GPP TS 38.331 V16.6.0, Sep. 2021, pp. 1-961.

* cited by examiner

*Primary Examiner* — Jamaal Henson
(74) *Attorney, Agent, or Firm* — JCIPRNET

(57) ABSTRACT

A method of configuring a PUSCH repetition and a UE using the same method are provided. The method includes: obtaining a plurality of invalid symbol patterns; and performing a plurality of PUSCH repetition transmissions according to the plurality of invalid symbol patterns.

18 Claims, 4 Drawing Sheets

METHOD OF CONFIGURING A PUSCH REPETITION AND USER EQUIPMENT USING THE SAME

CROSS-REFERENCE TO RELATED APPLICATION

The present application claims the benefit of and priority to U.S. Provisional Patent Application Ser. No. 63/135,487, filed on Jan. 8, 2021, entitled "METHOD AND APPARATUS FOR MULTIPLE TRP TRANSMISSION", the content of which is hereby incorporated fully by reference herein into the present disclosure.

BACKGROUND

Technical Field

The present disclosure generally relates to wireless communication, and more particularly, a method of configuring a physical uplink shared channel (PUSCH) repetition and a user equipment (UE) using the same method, wherein the UE may support multiple transmission/receiving points (multi-TRP).

Description of Related Art

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

SUMMARY

The present disclosure is directed to a method of configuring a PUSCH repetition and a UE using the same.

The present disclosure provides a method of configuring a physical uplink shared channel (PUSCH) repetition, adapted to a user equipment (UE) supporting multiple transmission and reception points (multi-TRP), wherein the method comprising: obtaining a plurality of invalid symbol patterns; and performing a plurality of PUSCH repetition transmissions according to the plurality of invalid symbol patterns.

In one embodiment of the disclosure, the method further comprising: obtaining a plurality of indicators including a first indicator and a second indicator, wherein the plurality of PUSCH repetition transmissions include a first PUSCH repetition transmission corresponding to the first indicator and a second PUSCH repetition transmission corresponding to the second indicator.

In one embodiment of the disclosure, the method further comprising: obtaining a plurality of indicators including a first indicator and a second indicator, wherein the plurality of invalid symbol patterns include a first invalid symbol pattern corresponding to the first indicator and a second invalid symbol pattern corresponding to the second indicator.

In one embodiment of the disclosure, the step of performing the plurality of PUSCH repetition transmissions according to the plurality of invalid symbol patterns comprising: performing a first PUSCH repetition transmission according to the first invalid symbol pattern; and performing a second PUSCH repetition transmission according to the second invalid symbol pattern.

In one embodiment of the disclosure, the first invalid symbol pattern indicates at least one invalid symbol, wherein the step of performing the first PUSCH repetition transmission according to the first invalid symbol pattern comprising: omitting the first PUSCH repetition transmission during the at least one invalid symbol.

In one embodiment of the disclosure, the step of performing the plurality of PUSCH repetition transmissions according to the plurality of invalid symbol patterns further comprising: performing the first PUSCH repetition transmission during a first time period; and performing the second PUSCH repetition transmission during a second time period, wherein the second time period is different from the first time period.

In one embodiment of the disclosure, the first indicator is associated with a first transmission and reception point (TRP) and the second indicator is associated with a second TRP.

In one embodiment of the disclosure, the first indicator corresponds to one of the followings: an index of a sounding reference signal (SRS) resource, an index of a SRS resource set, an SRS indicator (SRI), a transmitted precoding matrix indicator (TPMI), a transmission power control (TPC) indicator, a CORESET index, a CORESET pool index, a transmission configuration indication (TCI) state, and an identifier associated with a transmission and reception point (TRP).

In one embodiment of the disclosure, the step of obtaining the plurality of invalid symbol patterns comprising: receiving a signalling; and obtaining the plurality of invalid symbol patterns from the signalling.

In one embodiment of the disclosure, the signalling comprises one of the followings: a radio resource control (RRC) message, a downlink control indicator (DCI), and a medium access control (MAC) control element (CE).

The present disclosure provides a user equipment (UE) supporting multiple transmission and reception points (multi-TRP), comprising: one or more non-transitory computer-readable media having computer-executable instructions embodied thereon; and at least one processor coupled to the one or more non-transitory computer-readable media, and configured to execute the computer-executable instructions to: obtain a plurality of invalid symbol patterns; and perform a plurality of physical uplink shared channel (PUSCH) repetition transmissions according to the plurality of invalid symbol patterns.

In one embodiment of the disclosure, the at least one processor configured to execute the computer-executable instructions further to: obtain a plurality of indicators including a first indicator and a second indicator, wherein the plurality of PUSCH repetition transmissions include a first PUSCH repetition transmission corresponding to the first indicator and a second PUSCH repetition transmission corresponding to the second indicator.

In one embodiment of the disclosure, the at least one processor configured to execute the computer-executable instructions further to: obtain a plurality of indicators including a first indicator and a second indicator, wherein the plurality of invalid symbol patterns include a first invalid symbol pattern corresponding to the first indicator and a second invalid symbol pattern corresponding to the second indicator.

In one embodiment of the disclosure, the at least one processor configured to execute the computer-executable instructions further to: perform a first PUSCH repetition transmission according to the first invalid symbol pattern; and perform a second PUSCH repetition transmission according to the second invalid symbol pattern.

In one embodiment of the disclosure, the first invalid symbol pattern indicates at least one invalid symbol, wherein the at least one processor configured to execute the computer-executable instructions further to: omit the first PUSCH repetition transmission during the at least one invalid symbol.

In one embodiment of the disclosure, the at least one processor configured to execute the computer-executable instructions further to: perform the first PUSCH repetition transmission during a first time period; and perform the second PUSCH repetition transmission during a second time period, wherein the second time period is different from the first time period.

In one embodiment of the disclosure, the first indicator is associated with a first transmission and reception point (TRP) and the second indicator is associated with a second TRP.

In one embodiment of the disclosure, the first indicator corresponds to one of the followings: an index of a sounding reference signal (SRS) resource, an index of a SRS resource set, an SRS indicator (SRI), a transmitted precoding matrix indicator (TPMI), a transmission power control (TPC) indicator, a CORESET index, a CORESET pool index, a transmission configuration indication (TCI) state, and an identifier associated with a transmission and reception point (TRP).

In one embodiment of the disclosure, the at least one processor configured to execute the computer-executable instructions further to: receive a signalling; and obtain the plurality of invalid symbol patterns from the signalling.

In one embodiment of the disclosure, the signalling comprises one of the followings: a radio resource control (RRC) message, a downlink control indicator (DCI), and a medium access control (MAC) control element (CE).

To make the aforementioned more comprehensible, several embodiments accompanied with drawings are described in detail as follows.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DESCRIPTION OF THE EMBODIMENTS

Figure 1A:
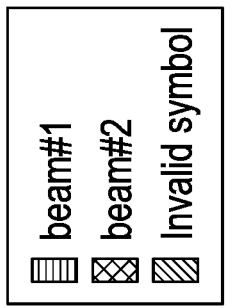
FIG. 1A and FIG. 1B illustrate a schematic diagram of different invalid symbol patterns according to an implementation of the present disclosure.
Figure 1A:
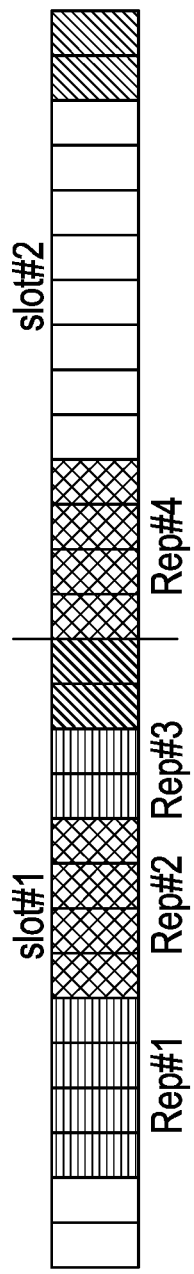

The acronyms in the present disclosure are defined as follows and unless otherwise specified, the acronyms have the following meanings:

Acronym Full name
3GPP 3rd Generation Partnership Project
5G 5th generation
ACK Acknowledgment
BWP Band Width Part
CC Component Carrier
CE Control Element
C-RNTI Cell Radio Network Temporary Identifier
CS-RNTI Configured Scheduling Radio Network Temporary Identifier
DC Dual Connectivity
DCI Downlink Control Information
DL Downlink
GC-PDCCH Group Common Physical Downlink Control Channel
HARQ Hybrid Automatic Repeat Request
IE Information Element
IIoT Industrial Internet of Things
LSB Least Significant Bit
LTE Long Term Evolution
L1 Layer 1
MAC Medium Access Control
MCG Master Cell Group
MCS-C-RNTI Modulation Coding Scheme Cell Radio Network Temporary Identifier
MIMO Multi-input Multi-output
MSB Most Significant Bit
NACK Negative Acknowledgment
NDI New Data Indicator
NR New RAT/Radio
NW Network
PCell Primary Cell
PSCell Primary Secondary Cell
PBCH Physical Broadcast Channel
PDCCH Physical Downlink Control Channel
PDSCH Physical Downlink Shared Channel
PDU Protocol Data Unit
PHY Physical
PRACH Physical Random Access Channel
PTAG Primary Timing Advance Group
PUCCH Physical Uplink Control Channel
PUSCH Physical Uplink Shared Channel
RA Random Access
RAN Radio Access Network
Rel Release
RMSI Remaining Minimum System Information
RNTI Radio Network Temporary Identifier
RLF Radio Link Failure
RRC Radio Resource Control
RS Reference Signal
RSRP Reference Signal Received Power
RV Redundancy Version
SCell Secondary Cell
SCG Secondary Cell Group
SCS Subcarrier Spacing
SINR Signal to Interference plus Noise Ratio
SpCell Special Cell
SR Scheduling Request SRS Sounding Reference Signal
SRI SRS Resource Indicator
SSB Synchronization Signal Block
STAG Secondary Timing Advance Group
TAG Timing Advance Group
TB Transport Block
TBS Transport Block Size
TCI Transmission configuration Indication
TPC Transmission Power Control
TPMI Transmitted Precoding Matrix Indicator
TR Technical Report
TRP Transmitting and Receiving Point
TS Technical Specification
TX Transmission
UE User Equipment
UL Uplink
URLLC Ultra Reliable Low Latency Communication
WG Working Group
WI Working Item The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Transmission Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit transmissions over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements.

The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC CONNECTED state that is not configured with the CA/DC, may communicate with only one serving cell (SCell) which may be the primary cell. Conversely, for a UE in the RRC CONNECTED state that is configured with the CA/DC a set of serving cells including the special cell(s) and all of the secondary cells may communicate with the UE.

It should be noted that, "beam" in the following implementations or examples may be replaced by "TRP" or "panel".

Some related technologies are introduced first.

Multi-TRP: New Radio (NR) supports downlink transmission of the same NR-PDSCH data stream(s) from multiple TRPs at least with ideal backhaul and different NR-PDSCH data streams from multiple TRPs with both ideal and non-ideal backhaul. The idea backhaul, for example, single DCI based multi-TRP scheme, enables single PDCCH scheduling data transmission associated with multiple TRPs and requires close coordination between the multiple TRPs. Alternatively, the non-idea backhaul, for example, multi-DCI based multi-TRP scheme may require multiple PDCCHs associated with each TRP having one PDCCH for scheduling the corresponding data transmission and result in delay of coordination of control signals and data among different TRPs. In 3GPP NR specification release 15 (Rel-15), a scalable and very flexible multiple-input-multiple-output (MIMO) framework is introduced. For example, support of beam management operation and flexible channel state information (CSI) acquisition. In NR Rel-16 work item, to achieve the increased robustness, lower overhead, and lower latency, enhancements on MU-MIMO support, multi-TRP/panel transmission including improved reliability and robustness with both idea and non-idea backhaul, and multi-beam operation which is primarily targeting FR2 operation are implemented.

PUSCH repetition Type B: In NR Rel-16 URLLC WI, to achieve lower latency requirement for PUSCH transmission, non-slot based PUSCH repetition is supported. The UE applies PUSCH repetition Type B procedure when the RRC parameter is set to "pusch-RepTypeB", and the number of repetitions is referred to nominal repetition. The number of nominal repetitions is given by parameter numberofrepetitions. If the number of potentially valid symbols for PUSCH repetition Type B transmission is greater than zero for a nominal repetition, the nominal repetition consists of one or more actual repetitions, wherein each actual repetition consists of a consecutive set of all potentially valid symbols that can be used for PUSCH repetition Type B transmission within a slot.

Invalid symbol pattern: The UE may be configured with the higher layer parameter InvalidSymbolPattern, which provides a symbol level bitmap spanning one or two slots (higher layer parameter symbols given by InvalidSymbolPattern). A bit value equal to 1 in the symbol level bitmap symbols indicates that the corresponding symbol is an invalid symbol for PUSCH repetition Type B transmission. The UE may be additionally configured with a time-domain pattern (higher layer parameter periodicityAndPattern given by InvalidSymbolPattern), wherein each bit of periodicityAndPattern corresponds to a unit equal to a duration of the symbol level bitmap symbols, and a bit value equal to 1 indicates that the symbol level bitmap symbols is present in the unit. When parameter periodicityAndPattern is not configured, for a symbol level bitmap spanning two slots, the bits of the first and second slots correspond respectively to even and odd slots of a radio frame, and for a symbol level bitmap spanning one slot, the bits of the slot correspond to every slot of a radio frame.

NumberOFInvalidSymbolsForDL-UL-Switching-r16: if numberOfInvalidSymbolsFor-DL-UL-Switching-r16 is configured, symbol(s) after the last symbol that is indicated as downlink in each consecutive set of all symbols that are indicated as downlink by tdd-UL-DL-ConfigurationCommon or tdd-UL-DL-ConfigurationDedicated are considered as invalid symbol(s) for PUSCH repetition Type B transmission. The symbol(s) given by numberInvalidSymbolsFor-DL-UL-Switching are defined using the reference SCS configuration referenceSubcarrierSpacing provided by tdd-UL-DL-ConfigurationCommon.

In 3GPP NR specification release 16 (Rel-16), for PUSCH repetition Type B, a UE may determine invalid symbol(s) for PUSCH repetition Type B transmission based on the higher layer parameter InvalidSymbolPattern. Invalid symbol pattern indicates a pattern of invalid symbols for PUSCH transmission repetition, wherein said PUSCH transmission repetition is applicable to both DCI format 0-1 and 0-2. In other words, an invalid symbol cannot be used for PUSCH repetition Type B transmission, and thus the segmentation may occur around invalid symbols in the invalid symbol pattern. More specifically, segmentation means that a nominal repetition may be split into more than one actual repetition if the configured repetition transmission includes invalid symbol(s) or crosses a slot boundary. An invalid symbol pattern is configured per band width part (BWP). However, different transmissions towards different TRPs (e.g., by applying different UL beams) may need different invalid symbols (e.g., different SRS configurations or different dynamic DL schedulings) in the same BWP.

Figure 1B:
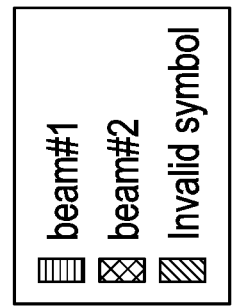
Figure 1B:
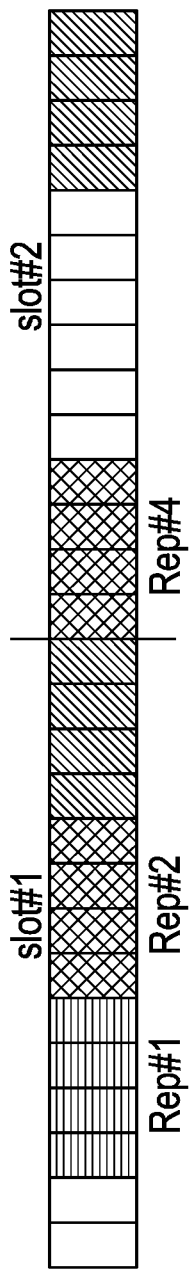

FIG. 1A and FIG. 1B illustrate a schematic diagram of different invalid symbol patterns according to an implementation of the present disclosure, wherein slots in FIG. 1A or FIG. 1B include symbols reserved for repetitions Rep #1, Rep #2, Rep #3, and Rep #4. Regarding applying different invalid symbol patterns towards two TRPs (i.e., TRP #1 corresponding to beam #1 and TRP #2 corresponding to beam #2), as shown in FIG. 1A and FIG. 1B, respectively, assume that the number of repetitions equal to 4 is configured towards two TRPs and the beam mapping pattern is cyclic mapping. That is, beam #1 and beam #2 are mapped to 4 transmission occasions if 2 beams are indicated. In FIG. 1A, the last two symbols in slot #1 and slot #2 are indicated as invalid symbols since the last two symbols are to be reserved for e.g., SRS transmission towards TRP #1. Assuming that the invalid symbol pattern in FIG. 1A is applied per BWP, part of Rep #3 to be transmitted to TRP #1 via beam #1 would be omitted. In FIG. 1B, the last four symbols in slot #1 and slot #2 are indicated as invalid symbols since the last four symbols are to be reserved for e.g., SRS transmission towards TRP #2 for estimating the quality of UL data packets carried by PUSCH. Assuming that the invalid symbol pattern in FIG. 1B is applied per BWP, the whole Rep #3 (not shown in FIG. 1B) to be transmitted to the TRP #1 via beam #1 would be omitted even though the invalid symbols in FIG. 1B are reserved for TRP #2 and TRP #2 does not intend to use the invalid symbols. Consequently, the omitted repetition may have negative impact on reliability of the communication system.

Figure 2:
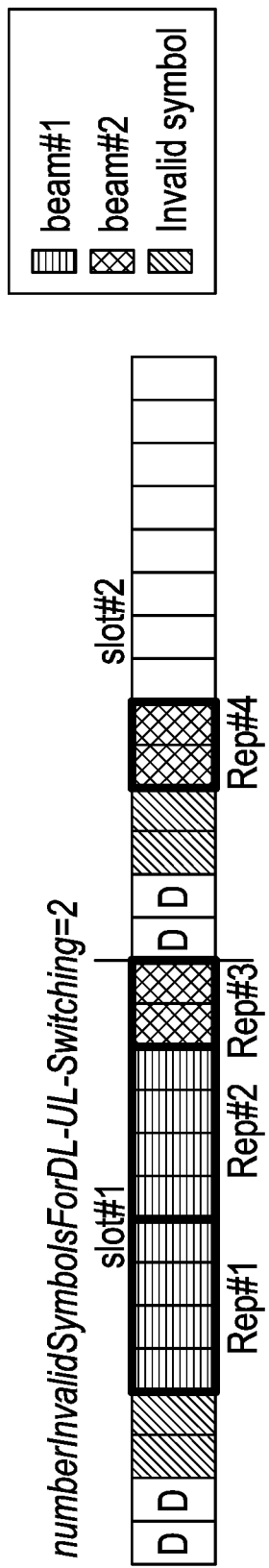
FIG. 2 illustrates a schematic diagram of applying numberOfInvalidSymbolsForDL-UL-Switching-r16 over a number of slots according to an implementation of the present disclousure.

In NR, a slot format includes DL symbols, UL symbols, and flexible symbols. If a UE is provided a slot configuration from network, the UE may set the slot format per slot. The symbols indicated as "D" and as "U" in this slot are used for downlink reception and uplink transmission, respectively. Besides, symbols indicated as "F" may reserve for a flexible scheduling. The symbols indicated as "F" may be overridden by other scheduling. Similarly, as shown in FIG. 2, the higher layer parameter numberOfInvalidSymbolsForDL-UL-Switching-r16 indicates the number of symbols after the last semi-static DL symbol that are invalid symbols for PUSCH repetition Type B. Since different TRPs may need different timing advance (TA), the transition time between downlink and uplink may be different. If the parameter numberOfInvalidSymbolsForDL-UL-Switching-r16 is configured without specifying TRP(s), the indicated invalid symbols for the reserved gap between downlink symbol and uplink symbol would be applied generally regardless of target TRP, and thus repetitions may be delayed unnecessarily. Consequently, the delayed transmission may have negative impact on increasing latency.

To enhance the efficiency of PUSCH repetition in multi-TRP scenario, the present disclosure provides a method which may configure different invalid symbol patterns and reserve different gaps between DL symbol and UL symbol for different TRPs respectively.

In one implementation, the indication of invalid symbols may be configured based on different PUSCH beams or based on different targeting TRPs for each PUSCH transmission.

In one implementation, a plurality of invalid symbol patterns corresponding to each target TRP (or PUSCH beam) may be configured to a UE.

In one implementation, the different invalid symbol patterns may be switched regularly, wherein each of the invalid symbol patterns may indicate one or more invalid symbols.

In one implementation, the indication of at least one invalid symbol may be dynamically indicated to a UE.

In one example, one or more PUSCH configurations (e.g., PUSCH-Config) may be configured. In one implementation, the invalid symbol pattern or/and the parameter for indicating the gap between DL symbol and UL symbol may be configured per TRP, per beam, per panel, per combination of TRP and panel, per combination of TRP and beam, and/or per combination of TRP, panel, and beam.

In one example, each invalid symbol pattern or/and the parameter for indicating the gap between DL symbol and UL symbol may have implicit or explicit linkage with beam, TRP, panel, per combination of TRP and panel, per combination of TRP and beam, and/or per combination of TRP, panel, and beam.

In one example, a combination of the following parameters may be used (e.g., by UE) to associate invalid symbol patterns (or/and parameters) with beams, TRPs, or panels: an index of SRS resource; an index of SRS resource set; an SRI (a field in a DCI format); a TPMI (a field in a DCI format), a TPC indicator (a field in a DCI format); a CORESET index (e.g., CORESETPoolIndex); a CORESET pool index, a TCI state; or an ID associated with a TRP.

In one example, UL transmissions towards different TRPs may apply different invalid symbol patterns for a UE. The UL transmissions may correspond to a PUSCH repetition transmission. The UL transmission may refer to a nominal repetition transmission (i.e., a repetition transmission scheduled by the network or base station) and an actual repetition transmission (i.e., a repetition transmission performed by the UE). In another example, UL transmissions based on different UE panel groups may apply different invalid symbol patterns, wherein a UE panel group may include one or more UE panels. From UE perspective, different TRPs or different UE panels may be indicated via a combination of the following options: each transmission corresponds to (or be associated with) one or more specific SRS resource sets, wherein the SRS resource set corresponding to one transmission may be same as or different from the SRS resource corresponding to another transmission; each transmission corresponds to (or be associated with) one specific SRS resource, wherein the SRS resource corresponding to one transmission may be same as or different from the SRS resource corresponding to another transmission; each transmission corresponds to (or be associated with) one or more specific TRP IDs (e.g., CORESETPoolIndex), wherein the TRP ID corresponding to one transmission may be same as or different from the TRP ID corresponding to another transmission; each transmission corresponds to (or be associated with) one or more specific TCI states, wherein the TCI state may provide a DL RS (e.g., CSI-RS or SSB) or UL RS (e.g., SRS) as reference for determining beam information for UL transmission, wherein a panel Id may be included in a TCI state; each transmission corresponds to (or be associated with) one or more specific spatial relation information, wherein the spatial relation information corresponding to one transmission may be same as or different from the spatial relation information corresponding to another transmission, wherein a panel ID may be included in the spatial relation information; each transmission corresponds to (or be associated with) one or more specific panel ID, wherein the panel ID corresponding to one transmission may be same as or different from the panel ID corresponding to another transmission; or each transmission corresponds to (or be associated with) one or more specific precoders (e.g., TPMI), wherein the precoder corresponding to one transmission may be same as or different from the precoder corresponding to another transmission.

In one example, different invalid symbol patterns or/and parameters may be applied sequentially or/and cyclically.

In one example, different invalid symbol patterns or/and parameters may be switched every slot, every half-slot, or every K repetitions, wherein K is a positive integer.

In one example, a field in the DCI for scheduling the PUSCH repetition may be used to indicate different invalid symbol patterns and/or parameters.

In one implementation, the indication of invalid symbol (or invalid symbol pattern) may be configured based on PUSCH beams. For example, while one or more beams are configured for PUSCH repetitions, the indication may be configured according to a combination of following options: a beam; a TRP; or a panel. For example, the indication of invalid symbol (or invalid symbol pattern) may be configured according to a TRP-related configuration. If there are two TRPs, a first indicator for indicating a first invalid symbol (or invalid symbol pattern) may be associated with the first TRP, and a second indicator for indicating a second invalid symbol (or invalid symbol pattern) may be associated with the second TRP.

For example, the indication of at least one invalid symbol may refer to an invalid symbol pattern. An invalid symbol pattern may be used to indicate a pattern of invalid symbols for a PUSCH transmission (or repetition). For example, value "0" in the invalid symbol pattern may mean that semi-static flexible symbols are used (or no invalid symbols are used) for the PUSCH transmission (or repetition), and thus the segmentation may occur only around semi-static DL symbols. Value "1" in the invalid symbol pattern may mean that the indicated invalid symbols are not valid (or no semi-static flexible symbols are used) for the PUSCH transmission (or repetition), and thus the segmentation may occur around semi-static DL symbols or invalid symbols indicated in the pattern. If the number of symbols configured for the transmission is the same as the number of the indicated invalid symbol, the transmission is omitted accordingly. Omitting a transmission may refer to not transmitting the transmission but counting the transmission as one of repetitions during repetition process. The remaining symbols (i.e., symbols other than the invalid symbols) are used for the PUSCH transmission (or repetition).

In one example, invalidSymbolPattern-r16 may or may not be configured in the parameter PUSCH-Config. One or more invalid symbol patterns may be configured in a configuration (e.g., TRP related configuration, a PUSCH configuration including a TRP-related identifier, or a TRP dedicated signalling) for scheduling multi-TRP PUSCH transmission.

In multi-TRP PUSCH transmission, more than one TRP may be involved for PUSCH transmission. The PUSCH transmission may be associated with a number of PUSCH repetitions. In one implementation, different PUSCH repetition transmissions may be associated with a same transport block. In one implementation, different PUSCH repetition transmissions may be associated with different transport blocks respectively. In one implementation, spatial relation information (e.g., UL beam) applied for the different PUSCH repetitions may or may not be the same.

In one example, the indication of invalid symbol (or invalid symbol pattern) may refer to the parameter used to indicate the gap between DL and UL symbols, such as parameter numberOfInvalidSymbolsForDL-UL-Switching-r16. For example, parameter numberOfInvalid-Symbols-ForDL-UL-Switching-r16 may or may not be configured in the PUSCH-Config. The parameter may be configured in a configuration (e.g., TRP related configuration, a PUSCH configuration including a TRP-related identifier, or a TRP dedicated signalling) for scheduling multi-TRP PUSCH transmission.

In one example, a new parameter (i.e., parameter not defined by the current specification) may be used to indicate the gap between DL and UL symbols for multi-TRP scheme.

In one example, a new parameter (i.e., parameter not defined by current specification) may be used to indicate the invalid symbol(s) (or invalid symbol pattern(s)) for multi-TRP scheme.

In one example, an invalid symbol pattern may include the parameters associated with a combination of the following options: an SRS resource; an SRS resource set; an SRI; a TPMI; a TPC indicator; a TCI states; a TRP related ID; a CORESET index; or a CORESET pool index. That is, an indicator of the invalid symbol pattern may correspond to an SRS resource, an SRS resource set, a SRI, a TPMI, a TPC indicator, a TCI state, a TRP related ID, a CORESET index, or a CORESET pool index.

In one example, repetition transmission (e.g., PUSCH repetition transmission) with different beams may refer to repetitive transmissions corresponding to different SRIs respectively. For example, if there are two beams, the SRI field in a DCI scheduling a PUSCH repetition transmission may include two parts (each part may include at least e.g., two bits), wherein one part may be configured for indicating beam #1 and the other part may be configured for indicating beam #2. The repetition(s) with beam #1 and the repetition(s) with beam #2 may apply different invalid indications according to different parts of the SRI field respectively. In one implementation, if there are at least two SRI fields in a DCI scheduling a PUSCH repetition transmission, one SRI field may be configured for indicating beam #1 and the other SRI field may be configured for indicating beam #2. The repetition(s) with beam #1 and the repetition(s) with beam #2 may apply different invalid indications according to different SRI fields of the DCI respectively.

In one example, repetition transmission (e.g., PUSCH repetition transmission) with different beams may refer to repetitive transmissions corresponding to different TPMIs respectively. For example, if there are two beams, the TPMI field in a DCI scheduling a PUSCH repetition transmission may include two parts (each part may include at least e.g., two bits), wherein one part may be configured for indicating beam #1 and the other part may be configured for indicating beam #2. The repetition(s) with beam #1 and the repetition(s) with beam #2 may apply different invalid indications according to different parts of the TPMI field respectively. In one implementation, if there are at least two TPMI fields in a DCI scheduling a PUSCH repetition transmission, one TPMI field may be configured for indicating beam #1 and the other TPMI field may be configured for indicating beam #2. The repetition(s) with beam #1 and the repetition(s) with beam #2 may apply different invalid indications according to different TPMI fields of the DCI respectively.

In one example, repetition transmission (e.g., PUSCH repetition transmission) with different beams may refer to repetitive transmissions corresponding to different TPC indicators respectively. Preferably, different TPC values may be applied to different beams or may correspond to different indicators respectively. For example, if there are two beams, the TPC indicator field in a DCI scheduling a PUSCH repetition transmission may include two parts (each part may include e.g., at least two bits), wherein one part may be configured for indicating beam #1 and the other part may be configured for indicating beam #2. The repetition(s) with beam #1 and the repetition(s) with beam #2 may apply different invalid indications according to different parts of the TPC indicator respectively. In one example, if there are two TPC indicator fields in a DCI scheduling a PUSCH repetition transmissions, one TPC indicator field may be configured for indicating beam #1 and the other field may be configured for indicating beam #2. The repetition(s) with beam #1 and the repetition(s) with beam #2 may apply different invalid indications according to different TPC indicator fields in the DCI respectively.

In one example, repetition transmission with different beams may refer to repetitive transmissions with indications from different SRS resource sets. Preferably, at least one SRS resource may be included in an individual SRS resource set. For example, if there are two beams, two (activated) SRS resource sets may be indicated by, for example, a MAC CE. The corresponding SRS resource(s) within each resource set may be specified by RRC configuration or MAC CE. Afterward, the repetition(s) with beam #1 indicated by one SRS resource set and the repetition(s) with beam #2 indicated by the other one SRS resource set may apply different invalid indications respectively.

In one example, individual invalid indications may be provided for individual SRS resource sets. In one example, different SRS resource sets are applied for different repetitive UL transmissions toward different TRPs respectively. For example, if there are two repetitive UL transmissions toward two TRPs respectively, two SRS resource sets may be respectively applied for each repetitive UL transmission toward different TRPs. One SRS resource set may be used for repetitive PUSCH transmission toward TRP #1 and the other SRS resource set may be used for repetitive PUSCH transmission toward TRP #2, wherein the repetitive PUSCH transmissions with different SRS resource sets may apply different invalid indications respectively.

In one example, repetition transmission with different beams may refer to repetitive transmissions with indication from different values of CORESETPoolIndex. Preferably, indication from different CORESETPoolIndex values may mean that DCI formats scheduling the repetition(s) are used to indicate different CORESETPoolIndex values. For example, if there are two DCI formats scheduling a PUSCH repetition transmission, different repetition transmissions respectively correspond to different DCI formats may be associated with different CORESETPoolIndex values. Repetitions respectively associated with different CORESETPoolIndex values may apply different invalid indications.

In one example, repetition transmission with different beams may refer to repetitive transmissions respectively corresponding to different TCI states. For example, if there are two beams, two TCI states may be activated and indicated in the same DCI format which is used to schedule the repetition transmission, and repetitions respectively corresponding to two TCI states may apply different invalid indications.

In one implementation, more than one invalid symbol patterns may be configured to a UE. For example, an invalid symbol pattern list may include at least two invalid symbol patterns, wherein each pattern may have a corresponding index. Preferably, repetitions (e.g., PUSCH repetitions) with different beams may respectively correspond to different invalid symbol patterns in the list. For example, repetition with beam #1 may apply invalid symbol pattern with index #0 (also referred to as "first invalid symbol pattern"), and repetition with beam #2 may apply invalid symbol pattern with index #1 (also referred to as "second invalid symbol pattern"). The UE may perform a first PUSCH repetition transmission according to invalid symbol pattern with index #0. Accordingly, the UE may omit the first PUSCH repetition transmission during one or more invalid symbols indicated by the invalid symbol pattern with index #0. On the other hand, the UE may perform a second PUSCH repetition transmission according to invalid symbol pattern with index #1. Accordingly, the UE may omit the second PUSCH repetition transmission during one or more invalid symbols indicated by the invalid symbol pattern with index #1.

In one example, the invalid symbol pattern list may be configured in a configuration related to multi-TRP based PUSCH repetition.

In one example, if the invalid symbol pattern list is configured, a new DCI field may include one or more bits to indicate the applied invalid symbol pattern. For example, bit value "0" may indicate that the first invalid symbol pattern needs to be applied, and bit value "1" may indicate the second invalid symbol pattern needs to be applied.

In one example, if the invalid symbol pattern list is configured, the number of bits of the existing invalid symbol pattern indicator field in a DCI format may increase to at least two bits. For example, bit values "00" may indicate invalid symbol pattern is absent, bit values "01" may indicate the first invalid symbol pattern (or invalid symbol pattern #0) is applied, and bit values "10" (or invalid symbol pattern #1) may indicate the second invalid symbol pattern is applied.

In one example, the invalid symbol pattern(s) may be activated or deactivated by a signalling. The UE may receive the signalling and obtain the invalid symbol pattern(s) from the signalling, wherein the signalling may include an RRC message, a DCI, or a MAC CE.

In one example, whether a plurality of invalid symbol patterns can be configured may depend on the UE capability. For example, a UE supporting multi-TRP communication may be configured with a plurality of invalid symbol patterns.

In one implementation, the different indications of invalid symbol (or invalid symbol pattern) may be switched regularly. For example, a UE may perform a PUSCH repetition transmission according to a first invalid symbol pattern during a first time period and perform a PUSCH repetition transmission according to a second invalid symbol pattern during a second time period, wherein the second invalid symbol pattern is different from the first invalid symbol pattern, and the second time period is different from the first time period. Preferably, the switching between different indications may be implicitly or explicitly indicated.

In one example, the indication of invalid symbol (or invalid symbol pattern) may be configured periodically, wherein the periodicity may depend on the beam mapping pattern or a pre-defined unit. For example, if two beams are configured based on the half-half pattern (first half of repetitions apply beam #1 and second half of repetitions apply beam #2), the invalid indication may switch per half of repetitions. Similarly, if two beams are mapped sequentially or cyclically, the invalid indications may be applied sequentially or cyclically. Preferably, the unit of periodicity may be in slot based, sub-slot based, a plurality of symbols based, a plurality of repetitions based, or beam mapping pattern based.

In one example, the indications of invalid symbol (or invalid symbol pattern) may be switched based on the DCI formats which are used to schedule the repetition transmission. For example, if the repetition transmission is scheduled by at least two DCI formats, the applied invalid indications may be configured according to the at least two DCI format. In one example, the at least two DCI format may include a first DCI format and a second DCI format, wherein the first DCI format may schedule a first half number of the PUSCH repetition transmission and the second DCI format may schedule a last half number of the PUSCH repetition transmission. The first half repetition transmission may apply the invalid symbol pattern related to the first DCI format, and the last half repetition transmission may apply the invalid symbol pattern related to the second DCI format. Preferably, the DCI format may indicate the applied invalid symbol pattern, and thus the switching periodicity between different invalid symbol patterns may depend on the DCI formats scheduling the PUSCH repetition transmission.

In one implementation, indications of invalid symbol (or invalid symbol pattern) may be dynamically indicated to a UE. Preferably, the dynamic indication may refer to an RRC message, a DCI format, or a MAC CE.

In one example, the number of invalid symbols reserved for DL/UL switching may be indicated by a field in the DCI.

In one example, the number of invalid symbols reserved for DL/UL switching may be included in different sets and indicated by the DCI accordingly. In one example, the number of invalid symbols for DL and the number of invalid symbols for UL are jointly indicated in the same set. For example, if there are two beams for repetition, wherein set 1 includes values (1,2) and set 2 includes values (3,4). The DCI may indicate the value in set 1 for beam #1 and indicate the value in set 2 for beam #2, wherein values (1,2) may indicate the number of invalid symbol reserved for DL of beam #1 is equal to 1 and the number of invalid symbol reserved for UL of beam #1 is equal to 2, and values (3,4) may indicate that the number of invalid symbol reserved for DL of beam #2 is equal to 3 and the number of invalid symbol reserved for UL of beam #2 is equal to 4.

In one example, the number of invalid symbols reserved for DL/UL switching may be included in different sets and activated by the MAC CE accordingly.

In one example, the number of invalid symbols reserved for DL/UL switching may be included in a table and indicated by a field in the DCI accordingly.

In one example, the invalid symbol patterns may be enabled or disabled separately. For example, a UE may obtain a plurality of indicators, wherein the plurality of indicators may include a first indicator corresponding to a first PUSCH repetition transmission or a first invalid symbol pattern and a second indicator corresponding to a second PUSCH repetition transmission or a second invalid symbol pattern. The UE may perform the first PUSCH repetition transmission according to the first invalid symbol pattern indicated by the first indicator and may perform the second PUSCH repetition transmission according to the second invalid symbol pattern indicated by the second indicator.

In one implementation, more than one PUSCH configurations may be configured to a UE. Preferably, a PUSCH configuration list may include at least two PUSCH-Config. Preferably, a PUSCH-Config may have corresponding index.

In one example, whether a PUSCH configuration list can be configured may depend on the UE capability. For example, a UE supporting multi-TRP communication may be configured with a PUSCH configuration list, wherein the PUSCH configuration list may include one or more PUSCH configurations.

In one example, transmission configured from different PUSCH-Config may correspond to different beams, TRPs, or panels. Preferably, if there are two beams, a first PUSCH-Config may configure the transmission correspond to beam #1 and s second PUSCH-Config may configure the transmission correspond to beam #2.

In one example, all or some parameters included in different PUSCH-Config may be configured separately (e.g., via different signallings).

In one example, if separate PUSCH-Config indicates the same resources for scheduling the repetition transmission, multi-TRP based PUSCH repetition may be applied.

Figure 3:
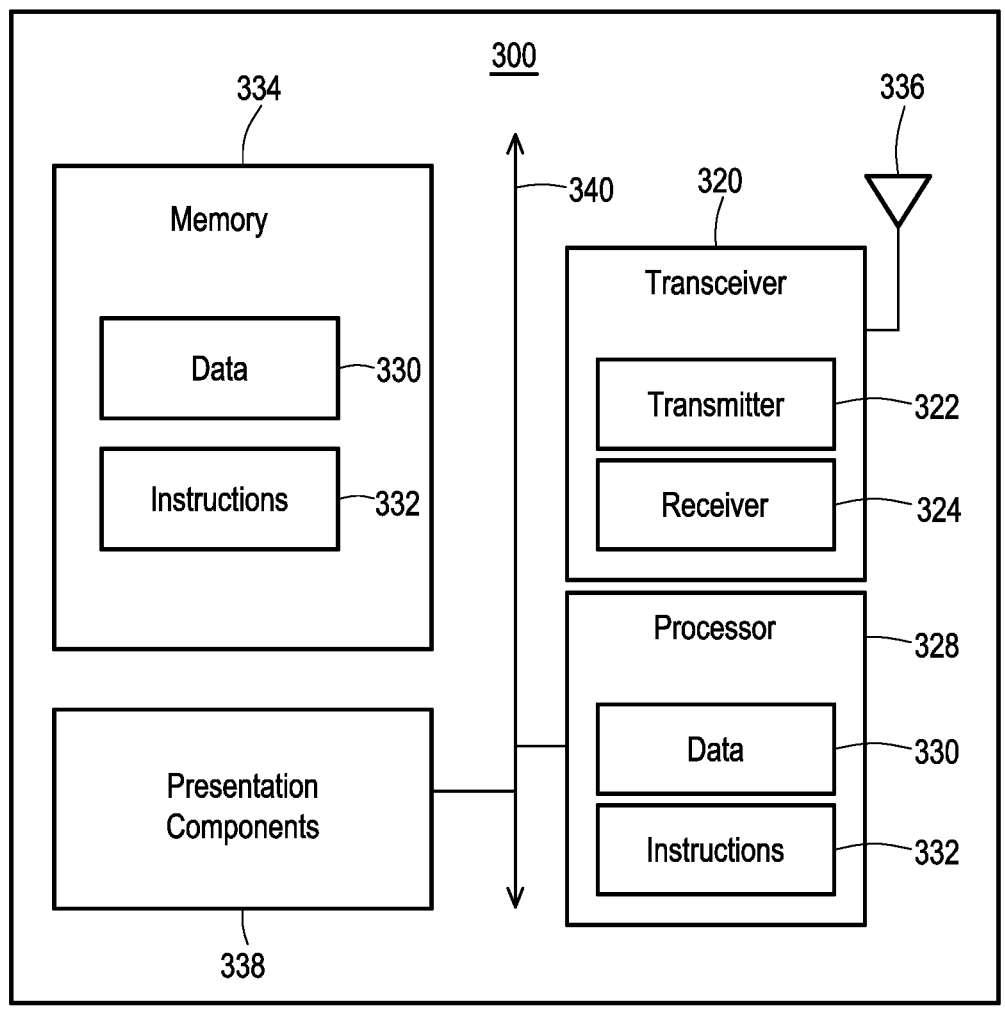
FIG. 3 illustrates a block diagram of a node for wireless communication according to an implementation of the present disclosure.

FIG. 3 illustrates a block diagram of a node 300 for wireless communication according to an implementation of the present disclosure, wherein node 300 may support multi-TRP communication. As shown in FIG. 3, node 300 may include a transceiver 320, a processor 328, a memory 334, one or more presentation components 338, and at least one antenna 336. The node 300 may also include an RF spectrum band module, a base station communications module, a network communications module, and a system communications management module, Input/Output (I/O) ports, I/O components, and power supply (not explicitly shown in FIG. 3). Each of these components may be in communication with each other, directly or indirectly, over one or more buses 340. In one implementation, the node 300 may be a UE or a base station that performs various functions described herein, for example, with reference to FIG. 1A through FIG. 2.

The transceiver 320 having a transmitter 322 (e.g., transmitting/transmission circuitry) and a receiver 324 (e.g., receiving/reception circuitry) may be configured to transmit and/or receive time and/or frequency resource partitioning information. In some implementations, the transceiver 320 may be configured to transmit in different types of subframes and slots including, but not limited to, usable, non-usable and flexibly usable subframes and slot formats. The transceiver 320 may be configured to receive data and control channels.

The node 300 may include a variety of computer-readable media. Computer-readable media can be any available media that can be accessed by the node 300 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data transmission. Communication media typically embodies computer-readable instructions, data structures, program modules or other data in a modulated data transmission such as a carrier wave or other transport mechanism and includes any information delivery media. The term "modulated data transmission" means a transmission that has one or more of its characteristics set or changed in such a manner as to encode information in the transmission. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 334 may include computer-storage media in the form of volatile and/or non-volatile memory. The memory 334 may be removable, non-removable, or a combination thereof. Exemplary memory includes solid-state memory, hard drives, optical-disc drives, and etc. As illustrated in FIG. 3, The memory 334 may store computer-readable, computer-executable instructions 332 (e.g., software codes) that are configured to, when executed, cause the processor 328 to perform various functions described herein, for example, with reference to FIG. 1 through FIG. 2. Alternatively, the instructions 332 may not be directly executable by the processor 328 but be configured to cause the node 300 (e.g., when compiled and executed) to perform various functions described herein.

The processor 328 (e.g., having processing circuitry) may include an intelligent hardware device, e.g., a Central Processing Unit (CPU), a microcontroller, an ASIC, and etc. The processor 328 may include memory. The processor 328 may process the data 330 and the instructions 332 received from the memory 334, and information through the transceiver 320, the base band communications module, and/or the network communications module. The processor 328 may also process information to be sent to the transceiver 320 for transmission through the antenna 336, to the network communications module for transmission to a core network.

One or more presentation components 338 presents data indications to a person or other device. Exemplary presentation components 338 include a display device, speaker, printing component, vibrating component, and etc.

Figure 4:
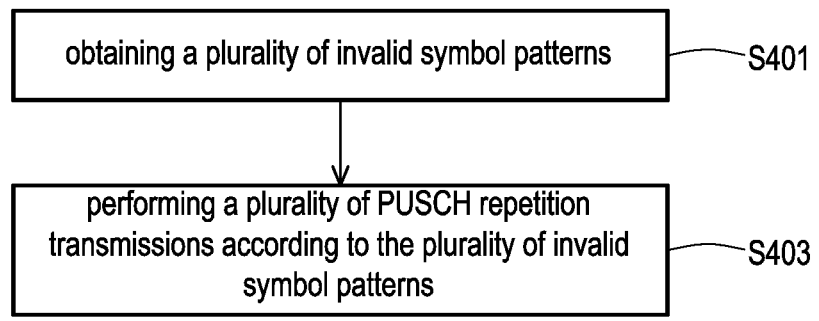
FIG. 4 illustrates a flowchart of a method of configuring a PUSCH repetition according to an implementation of the present disclosure.

FIG. 4 illustrates a flowchart of a method of configuring a PUSCH repetition according to an implementation of the present disclosure, wherein the method may be implemented by the node 300 as shown in FIG. 3. In step S401, obtaining a plurality of invalid symbol patterns. In step S403, performing a plurality of PUSCH repetition transmissions according to the plurality of invalid symbol patterns.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of configuring a physical uplink shared channel (PUSCH) repetition, adapted to a user equipment (UE) supporting multiple transmission and reception points (multi-TRP), wherein the method comprising:
    obtaining a plurality of invalid symbol patterns;
    obtaining a plurality of indicators including a first indicator and a second indicator, wherein the plurality of invalid symbol patterns include a first invalid symbol pattern corresponding to the first indicator and a second invalid symbol pattern corresponding to the second indicator, wherein the first indicator corresponds to a first index of a sounding reference signal (SRS) resource and the second indicator corresponds to a second index of a SRS resource; and
    performing a plurality of PUSCH repetition transmissions according to the plurality of invalid symbol patterns and the plurality of indicators.

2. The method of claim 1,
    wherein the plurality of PUSCH repetition transmissions include a first PUSCH repetition transmission corresponding to the first indicator and a second PUSCH repetition transmission corresponding to the second indicator.

3. The method of claim 1, wherein the step of performing the plurality of PUSCH repetition transmissions according to the plurality of invalid symbol patterns and the plurality of indicators comprising:
    performing a first PUSCH repetition transmission according to the first invalid symbol pattern; and
    performing a second PUSCH repetition transmission according to the second invalid symbol pattern.

4. The method of claim 3, wherein the first invalid symbol pattern indicates at least one invalid symbol, wherein the step of performing the first PUSCH repetition transmission according to the first invalid symbol pattern comprising:
    omitting the first PUSCH repetition transmission during the at least one invalid symbol.

5. The method of claim 3, wherein the step of performing the plurality of PUSCH repetition transmissions according to the plurality of invalid symbol patterns and the plurality of indicators further comprising:
    performing the first PUSCH repetition transmission during a first time period; and
    performing the second PUSCH repetition transmission during a second time period, wherein the second time period is different from the first time period.

6. The method of claim 1, wherein the first indicator is associated with a first transmission and reception point (TRP) and the second indicator is associated with a second TRP.

7. The method of claim 1, wherein the first indicator further corresponds to one of the followings:
    an index of a SRS resource set, an SRS indicator (SRI), a transmitted precoding matrix indicator (TPMI), a transmission power control (TPC) indicator, a CORESET index, a CORESET pool index, a transmission configuration indication (TCI) state, and an identifier associated with a transmission and reception point (TRP).

8. The method of claim 1, wherein the step of obtaining the plurality of invalid symbol patterns comprising:
    receiving a signalling; and
    obtaining the plurality of invalid symbol patterns from the signalling.

9. The method of claim 8, wherein the signalling comprises one of the followings:
    a radio resource control (RRC) message, a downlink control indicator (DCI), and a medium access control (MAC) control element (CE).

10. A user equipment (UE) supporting multiple transmission and reception points (multi-TRP), comprising:
    one or more non-transitory computer-readable media having computer-executable instructions embodied thereon; and
    at least one processor coupled to the one or more non-transitory computer-readable media, and configured to execute the computer-executable instructions to:
    obtain a plurality of invalid symbol patterns;
    obtain a plurality of indicators including a first indicator and a second indicator, wherein the plurality of invalid symbol patterns include a first invalid symbol pattern corresponding to the first indicator and a second invalid symbol pattern corresponding to the second indicator, wherein the first indicator corresponds to a first index of a sounding reference signal (SRS) resource and the second indicator corresponds to a second index of a SRS resource; and
    perform a plurality of physical uplink shared channel (PUSCH) repetition transmissions according to the plurality of invalid symbol patterns and the plurality of indicators.

11. The UE of claim 10,
    wherein the plurality of PUSCH repetition transmissions include a first PUSCH repetition transmission corresponding to the first indicator and a second PUSCH repetition transmission corresponding to the second indicator.

12. The UE of claim 10, wherein the at least one processor configured to execute the computer-executable instructions further to:
    perform a first PUSCH repetition transmission according to the first invalid symbol pattern; and
    perform a second PUSCH repetition transmission according to the second invalid symbol pattern.

13. The UE of claim 12, wherein the first invalid symbol pattern indicates at least one invalid symbol, wherein the at least one processor configured to execute the computer-executable instructions further to:
    omit the first PUSCH repetition transmission during the at least one invalid symbol.

14. The UE of claim 12, wherein the at least one processor configured to execute the computer-executable instructions further to:
    perform the first PUSCH repetition transmission during a first time period; and
    perform the second PUSCH repetition transmission during a second time period, wherein the second time period is different from the first time period.

15. The UE of claim 10, wherein the first indicator is associated with a first transmission and reception point (TRP) and the second indicator is associated with a second TRP.

16. The UE of claim 10, wherein the first indicator further corresponds to one of the followings:
    an index of a SRS resource set, an SRS indicator (SRI), a transmitted precoding matrix indicator (TPMI), a transmission power control (TPC) indicator, a CORESET index, a CORESET pool index, a transmission configuration indication (TCI) state, and an identifier associated with a transmission and reception point (TRP).

17. The UE of claim 10, wherein the at least one processor configured to execute the computer-executable instructions further to:
  receive a signalling; and
  obtain the plurality of invalid symbol patterns from the signalling.

18. The UE of claim 17, wherein the signalling comprises one of the followings:
  a radio resource control (RRC) message, a downlink control indicator (DCI), and a medium access control (MAC) control element (CE).

* * * * *